Jan. 2, 1934.  E. G. STONE  1,942,192

COTTON HARVESTER

Filed March 7, 1927

*Enoch Garnet Stone*

INVENTOR.

Patented Jan. 2, 1934

1,942,192

UNITED STATES PATENT OFFICE 1,942,192

COTTON HARVESTER

Enoch Garnet Stone, Piedmont, Okla.

Application March 7, 1927. Serial No. 173,449

5 Claims. (Cl. 56—33)

My invention relates to the process of harvesting cotton in the cotton bolls or burs.

The object of my invention is to produce a cotton harvesting machine for harvesting cotton, cotton-bolls, or burs, from the cotton plants in the row and empty them in a container or carrier which will be new, novel, simple, cheap, efficient and of utility; which will be simple in construction, practical in application, and which can be cheaply manufactured and operated; which will be strong and durable, easy and light of draft, and which will produce the result for which it is intended.

I do not claim this to be a cotton ginner or cleaner.

With these and other objects in view my invention consists in the construction, novel features, and combination of parts hereinafter more fully described, illustrated in the accompanying one-sheet drawing described in the specification, and pointed out in the claims hereunto appended; it being understood that various changes in form, proportion, size, shape, weight and minor details within the scope of my invention may be resorted to without departing from the spirit or principle of the invention or sacrificing any of the advantages thereof.

Figure 1:
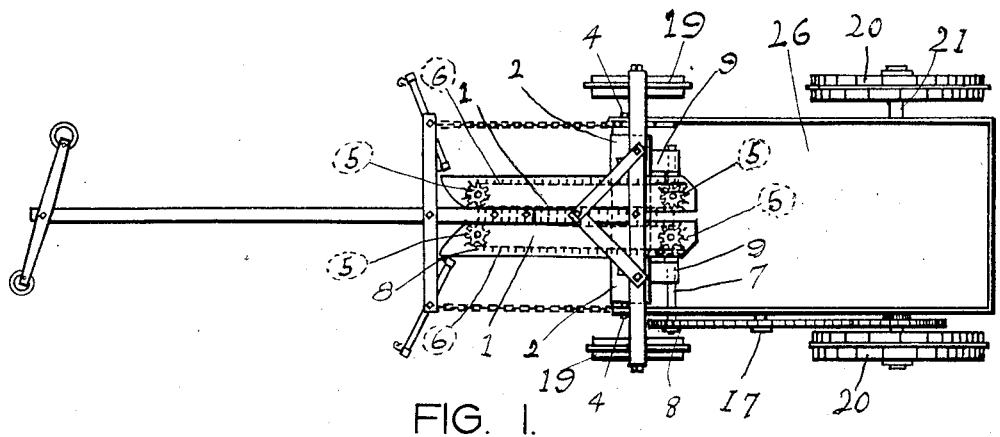
Figure 2:
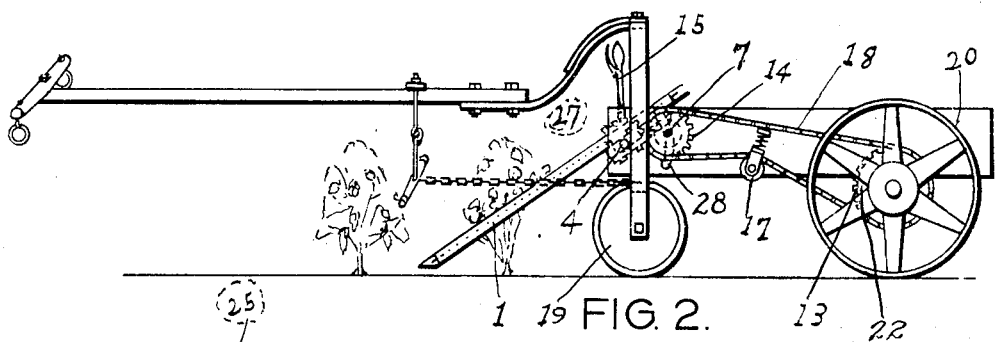
Figure 3:
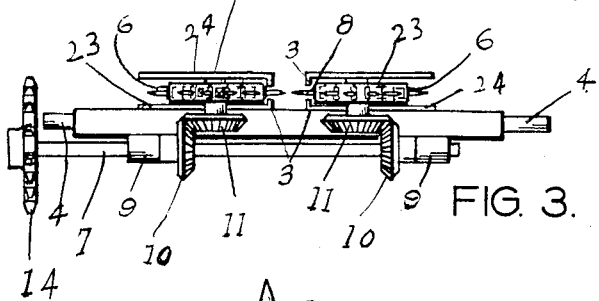
Figure 4:
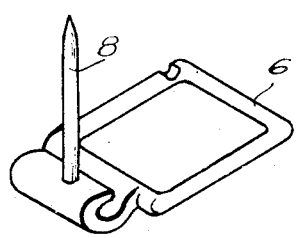

Figure 1 is a plan view of the harvester; Fig. 2 is a side view of the harvester; Fig. 3 is a rear elevational view of the gathering arms; Fig. 4 is a perspective view of a link of the chain showing a finger or spike thereon.

Like characters of reference designate like parts in all the figures.

The accomplishment of the result for which my invention is intended, is brought about as follows:

I provide two paralleled spaced arms 1 whose lower ends are adapted to be adjacent the ground when the device is in operation and whose upper ends are adapted to be adjacent the front end of a receiving and carrying receptacle 26. The arms may be raised and lowered by a hand lever and release 15. I provide draft means for propelling or drawing the device along the rows of cotton but this is not claimed as new. The harvester is intended to be drawn by a team of horses, mules or the like, tho it may be otherwise drawn when desired. A cross-bar 2 is provided on which to seat the upper ends of said arms 1, and at each end of said cross-bar 2 is provided bearing spindles 4 for inserting in bearing seats in the front part of said bed or receptacle. Said spindles 4 are provided as axes for the adjustment of the incline of said arms 1 by lever 15. Lever 15 is rigidly attached to said cross-bar 2 and is adapted to co-act with a rack, not shown, in holding said arms 1 in varying degrees of inclination. The varying of the position of said lever 15 will cause said cross-bar 2, to partially rotate upon said spindles 4. The side of the bed is provided with an arcuate slot 28 through which the end of shaft 7 moves when the position of the arms is varied. Said cross-bar has extended rearwardly bearing lugs or shoulders 9, having at their rear end portions bearing seats for a shaft 7. This shaft 7 as stated is seated in said lugs and one of its ends passes through one side of the front end portion of bed or receptacle 26 and has rigidly attached to such end a sprocket wheel 14. On this sprocket wheel 14 operates a sprocket chain 18 working on an idler 17 and on a second sprocket wheel 13 on one of the rear wheels 20 of the said receptacle 26 turning on axle 21 between said wheel and said bed 26. On each of said arms 1 adjacent both their front and rear ends I provide an upstanding pinion with a sprocket wheel 5 thereon. On said shaft 7 I provide two bevel gears 10 both cog portions thereof preferably pointing inwardly and meshing with pinions 11 mounted on shafts thereabove, said shafts also having mounted and revolving thereon the two upper sprocket wheels 5. On said sprocket wheels 5 on said arms 1 are fitted sprocket chains 6, one on each of said arms. These revolve respectively clock-wise and counterclock-wise so as to make their upward and rearward movement adjacent the inside face surfaces of said arms 1. Said sprocket wheels 5 and sprocket chains 6 are adapted to move parallel to the faces of said arms 1 and longitudinally of said arms. Pinions 11 and sprocket wheels 5 on the rear end of said arms 1 and the shafts therebetween are preferably made integral, though this is not absolutely necessary, though they must, respectively, be rigidly fastened together and move simultaneously. On each of the links of said sprocket chains 6 I provide an outstanding spike or finger 8. These are intended to comb the cotton plants as the chains move upwardly and to beat the bolls off of the plants and to separate the cotton from the opened and partially opened bolls and to carry both upward to the bed or receptacle 26. The links on the chains on reaching the uppermost point of their throw in going around the end of the upper sprocket wheels 5 separate so that the spikes or fingers 8 are further apart and permit the bolls and cotton to be disengaged therefrom and to drop in the bed or receptacle 26. Adjacent each of said arms 1 I provide a bottom and a top piece 23 and 24 extending outwardly a sufficient distance to form a groove or channel in which said sprocket chains 6 move and to fully protect the spikes or fingers 8 from coming in contact with the plants and bolls and cotton on the downward course of said chains. I also provide turned down and turned up portions 3 on the inner ends of said bottom and top pieces 23 and 24 so as to assist in separating the bolls and cotton from the chains and from said spikes or fingers and to permit said product to be deposited in said bed 26, and to hold said chains securely against the middle section 25.

I prefer to have said sprockets, chains, and the spikes or fingers thereon arranged so as to be staggered, though this is not absolutely essential, and they may be arranged otherwise when desired.

It will be apparent to those familiar with the art to which my invention pertains that if the driving mechanism driven by the rear wheel be not connected that the drawing of the device along the cotton row and the striking of the spikes or fingers 8 on the plants and the upward and backward movement of the chains would do a fair job of harvesting. A plurality of arms instead of a single pair may be used if desired. This might be particularly desirable in tall and heavy cotton, and ample changes may be made therefor in the spacing of said arms with relation to the cotton crop. I prefer the spikes or fingers to be placed parallel with the longitudinally inclined arms, but these may be pointed slightly upwardly; or they may be placed on said links pointing upwardly at right angles to the upper side of each link, or may be placed perpendicularly with relation to their movement upwardly on said inclined arms; or they may be placed at either the top or bottom portion of said chains, as desired.

In operation it will be apparent that when the device is drawn forward with the arms 1 straddling the row of cotton, wheel 20 with sprocket chain 18 operating on sprocket wheel 22 between said wheel and said bed the chain 18 will by traction of said wheel and the turning of said sprocket wheel 22 be turned backwardly riding on said idler 17 and turn counter-clock-wise sprocket wheel 14 on shaft 7 thereby turning bevel gears 10 causing them to mesh with pinions 11 integral with upper sprocket wheels 5 turning the left sprocket wheel 5 clock-wise and the right sprocket wheel 5 counter-clock-wise; thereby drawing the sprocket chains 6 upwardly at the same time adjacent the inner portions of arms 1 and after passing said upper sprocket wheels 5 will be carried downwardly adjacent the outer portions of said arms 1 until they reach said lower sprocket wheels 5 where they will respectively take an upward course adjacent the inner portions of said arms 1. The movement of said chains and spikes and the straddling of the arms over the row of cotton will cause the bolls and the partially opened, and opened cotton to be dislodged from their seats on the plant, and they will be carried upward and rearward to the front part of bed 26 where they will be deposited for delivering to the cotton pile, or barn, or baled for safe keeping.

Having thus described my invention what is claimed and desired to be secured by Letters Patent is:—

1. In a device, of the class described for harvesting cotton, a vehicle having a bed with sides and adapted to be drawn, and having driving wheels adapted for traction on the ground, a sprocket wheel attached to one of said wheels, a tongue having guiding wheels attached thereto, said vehicle having a cross-bar mounted between the front ends of the body sides, said bar supporting a pair of parallel inclined spaced apart arm members, extension lugs on said cross-bar, a shaft supported on said extension lugs and supporting a second sprocket wheel alined with said first sprocket wheel, said body forming a receptacle for receiving harvested cotton, said shaft extending through the wall of said receptacle, and having driving gears centrally thereon, bevel gears meshing with said driving gears having integral sprocket wheels thereon paralleling the faces of said inclined parallel arm members, sprocket chains operating on said last named sprocket wheels having spikes thereon operable upwardly adjacent the inner edges of said arm members, and projecting towards each other into the space between said arm members for combing and stripping the bolls and cotton and conveying them to said receptacle, means for adjusting the incline of said arm members, guard members for protecting said chains and spikes on their downward movement from the plants and for removing the bolls and cotton from said chains and spikes, a sprocket chain operating said first and second sprocket wheels in connection with an idler.

2. A device of the class described, embodying a vehicle adapted to be drawn by horses, said vehicle having a vertical sided bed mounted on four wheels, said wheels adapted for traction with the ground, a sprocket wheel mounted adjacent one of said wheels and revoluble therewith, said bed having a cross-bar mounted between the front ends of its side walls, a shaft mounted on extension lugs from said cross-bar one of its ends carried through said bed and supporting a second sprocket wheel, a chain operating on an idler and adapted to connect said sprocket wheels, a pair of upwardly inclined parallel arms each having a sprocket wheel revoluble parallel with the upper face of said arms adjacent their upper and lower ends, sprocket chains having spikes on each link, said chains adapted to revolve on said sprockets so that they will both pass upwardly on the inside edges of said arms said chains and spikes adapted for gathering bolls and cotton from the plants and conveying them to said bed, operative means connecting said shaft, and said chains.

3. A cotton gathering device embodying the combination of a wheeled vehicle adapted to be drawn and a driving wheel adapted for traction on the ground and connection thereto whereby sprocket chains having spikes thereon operable upwardly adjacent the inner edges of inclined, spaced-apart arm members are driven over sprocket wheels mounted on said spaced-apart arm members, the links of said sprocket chains having a single spike on a single link, each of said spikes being approximately the same thickness cross sectionally from base substantially to point of free end as the spike is measured transversely in line with length of chain, so that each space formed between spikes may be of uniform width from bases of spikes substantially to points of free ends of said spikes, each of said spikes having a comparatively straight upper side as considered in operating position, (that the cotton may be stripped uniformly along the spike), and placed on said link so as to extend substantially horizontally to substantially the center of the space between the said inclined arm members.

4. A cotton gathering device embodying the combination of a wheeled vehicle adapted to be drawn and driving wheels adapted for traction on the ground and connection thereto whereby sprocket chains having spikes thereon operable upwardly adjacent the inner edges of inclined spaced-apart arm members are driven over sprocket wheels mounted on said spaced-apart arm members, the links of said sprocket chains having a single spike on a single link, each of said spikes being approximately the same thickness cross sectionally from base substantially to pointed part of free end as the spike is measured transversely in line with the length of chain, so that each space formed between spikes may be about of uniform width from the bases of spikes to pointed parts of free ends of said spikes, each of said spikes having a comparatively straight upper side as considered in operating position, (that the cotton may be stripped uniformly along the spike), and placed on said link so as to extend substantially horizontally to any desired position between said inclined arm members.

5. A cotton gathering device embodying the combination of a wheeled vehicle with inclined spaced-apart arm members substantially parallel mounted thereon, sprocket chains having spikes thereon and means for driving them upwardly adjacent the inner edges of said spaced-apart arm members over sprocket wheels suitably arranged therefor, the links of said sprocket chains having a single spike on a single link, each of said spikes having a blunt non-cutting upper side as considered in operating position, (that limbs may not be cut from the cotton plant), the said spikes placed on the said links so that the sprockets of the said wheels on which they run enter the said links at the side of the base of the said spikes, otherwise, the said spikes to be made in any desired form and so placed on the said links as to project inwardly into the space between the said inclined, spaced-apart arm members.

ENOCH G. STONE.